United States Patent [19]

Corzine et al.

[11] 4,387,591
[45] Jun. 14, 1983

[54] METHOD FOR TESTING FLUID CONTROL VALVES

[75] Inventors: Gerald G. Corzine, Hazelwood; Charles E. Hagar, Augusta, both of Mo.

[73] Assignee: The United States of America as represented by the Secretary of the Navy, Washington, D.C.

[21] Appl. No.: 256,327

[22] Filed: Apr. 22, 1981

[51] Int. Cl.³ .................... G01F 25/00; G01M 19/00
[52] U.S. Cl. ........................................... 73/168; 73/40
[58] Field of Search ................... 73/168, 40, 46, 49.7, 73/40.5 R; 137/552, 557

[56] References Cited

U.S. PATENT DOCUMENTS

| | | | |
|---|---|---|---|
| 2,449,556 | 9/1948 | Kirkley | 73/40 |
| 2,660,187 | 11/1953 | Welty et al. | 137/552 X |
| 2,882,854 | 12/1956 | Schroeder | 116/117 |
| 3,185,128 | 5/1965 | Moore et al. | 116/274 |
| 3,360,981 | 1/1968 | Badger | 73/40 |
| 3,477,289 | 8/1966 | Wiebe | 73/198 |
| 3,857,350 | 12/1974 | Rohan | 137/557 |
| 4,006,761 | 2/1977 | Bonafous | 141/113 |
| 4,101,874 | 7/1978 | Denison et al. | 340/606 |

Primary Examiner—James J. Gill
Attorney, Agent, or Firm—Robert F. Beers; Frederick A. Wein

[57] ABSTRACT

A test apparatus for determining the operable condition of fuel level control valves is presented. A sensor is connected to a fuel line for delivery of a test sample of fuel through the fuel line to a receiving system from a fuel supply source. At least one valve is disposed in the fuel line between the sensor and the fuel receiving system. A plurality of sense lines is connected from the sensor to a flow indicator and a pressure indicator such that simultaneous indication of the visual flow indicator and the visual pressure indicator within respective predetermined limits upon a delivery of the test sample of the fuel prior to delivery of the fuel through the fuel line indicates that the fuel level control valve is not properly operable.

1 Claim, 1 Drawing Figure

METHOD FOR TESTING FLUID CONTROL VALVES

BACKGROUND OF THE INVENTION

The present invention relates to fuel loading systems, and more particularly, to an apparatus and positive method for indicating the proper precheck operability of fuel level control valves of a fuel receiving system.

The fuel loading system for aircraft, and particularly military aircraft, includes fuel level control valves, or check valves, for controlling the received amount of fuel upon refueling of the airplane by ground equipment. The existing method used by ground maintenance personnel to verify the fueling operation of the fuel level control valve is to observe "hose kicks" which results in the hose stiffening when fuel flow is stopped by the fuel level control valves upon achieving a predetermined level of fuel in the receiving system. In systems wherein a plurality of airplanes are simultaneously fueled from a common fuel supply source, such as a tank truck, the hose kick resulting from adequate fueling of one airplane is attenuated by connection of other hoses simultaneously fueling other airplanes. In such a case, improper operation of a fuel level control valve will be difficult to observe with the result that the fuel tank of the respective airplane will overflow with the excess fuel exiting through an overflow vent thereby resulting in fuel spillage onto the ground or a flight deck of an aircraft carrier. Such a spillage presents a substantial safety hazard.

Additionally, it is not uncommon for a fuel level control valve to only partially close at the proper refueling cut-off point. In such an event, a "hose kick" will result, however, fuel flow into the airplane fuel tank may not be completely shut-off and continues at a reduced rate with resulting overflow spillage and safety hazard conditions described hereinabove. Accordingly, it is desirable to provide an apparatus and method for checking the proper operability of the fuel control valves prior to delivery of fuel.

SUMMARY OF THE INVENTION

Briefly, the present invention relates to an apparatus and method thereof for checking the proper operability of fuel level control valves in a refueling system prior to actual refueling of the system. A fuel sensor is connected to a fuel line between the fuel supply source and a fuel receiving system of the aircraft. A plurality of sense lines comprising tubing is connected to the fuel sensor. A fuel flow indicator for determining flow rate of the test sample of fuel passing through the fuel line is connected to the sense line and comprises a rotatably observable wheel, the rotation of which is indicative of rate of flow entering the aircraft, and a pressure indicator for indicating the pressure of the sample of fuel at the vent space of the fuel line. The simultaneous indication of the fuel flow indicator and the fuel pressure indicator within respective predetermined limits is indicative that the fuel level control valves are not operating properly.

OBJECTS OF THE INVENTION

Accordingly, with reference to the background of the invention hereinabove, it is an object of the present invention to provide an apparatus and method for determining the operable condition of the fuel level control valves of a fuel receiving system prior to delivery of fuel to the fuel receiving system from a fuel supply source. It is another object of the present invention to provide apparatus and method for determining the operable condition of a fuel level control valves wherein a simultaneous indication of a fuel flow indicator and a fuel pressure indicator within respective predetermined limits is indicative that the fuel level control valves are not properly operable.

Further objects and advantages of the present invention will become apparent as the following description proceeds and features of novelty characterizing the invention will be pointed out with particularity in the claims annexed to and forming a part of this specification.

DESCRIPTION OF THE DRAWING

For a better understanding of the present invention reference may be had to the accompanying drawing wherein.

DETAILED DESCRIPTION OF A PREFERRED EMBODIMENT

Figure 1:
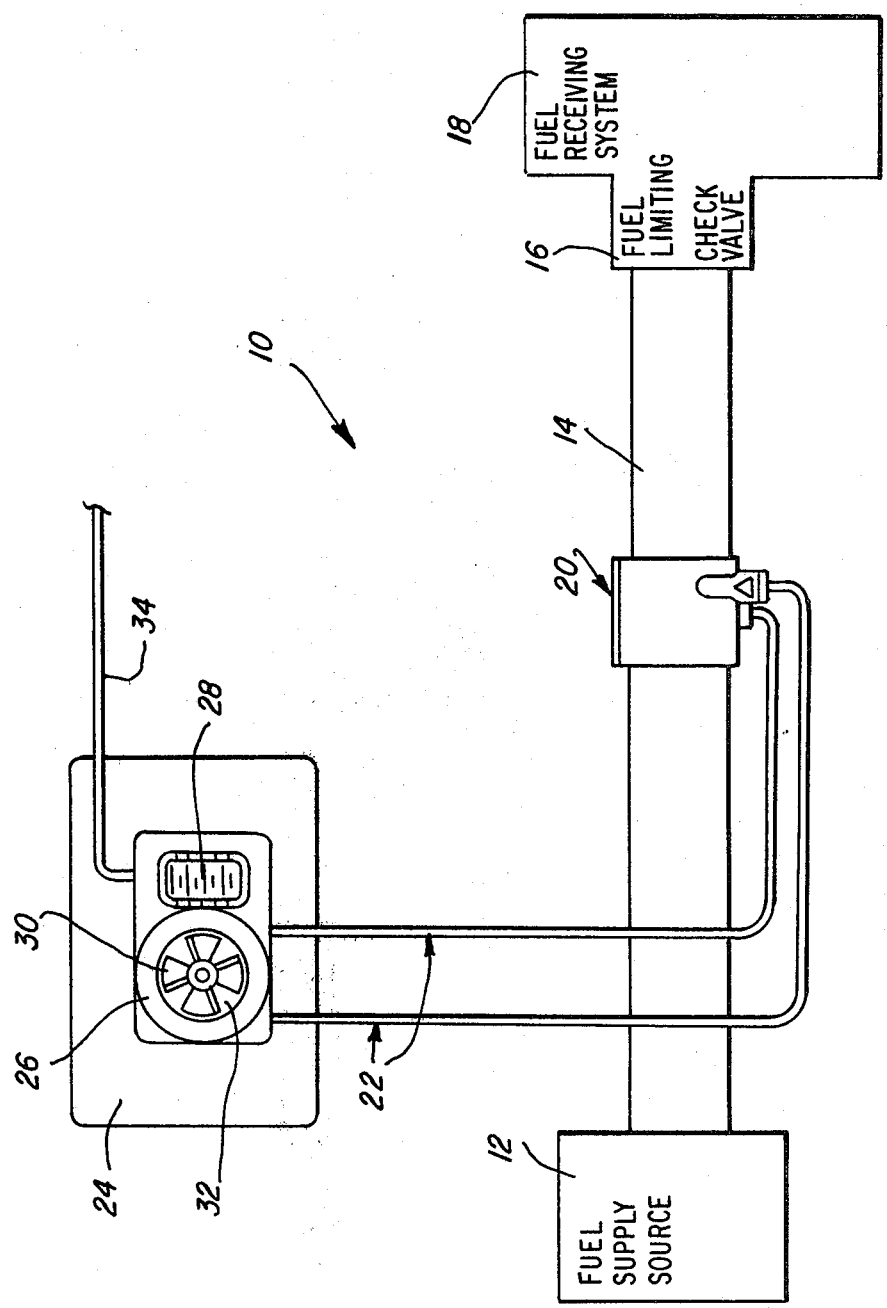
FIG. 1 is a diagrammatic representation of a fuel system having fuel level control valves and apparatus for determining the operable condition of the fuel level control valves prior to delivery of fuel through a fuel line.

Referring now to the accompanying drawing wherein the same reference numerals have been applied to like parts, FIG. 1 shows a refueling system, generally designated 10, comprising a fuel supply source 12 for feeding fuel through a fuel line or conduit 14 and into a fuel level control or a fuel limiting check valve 16 for filling a fuel receiving system 18 usually comprising a fuel tank (not shown). The fuel receiving system typically is part of a vehicle, and in the exemplary embodiment, is a fuel storage tank of a military aircraft. A fuel sensing fuel sensor 20 is installed in the fuel line 14 for sensing fuel traveling therein. A plurality of sense lines 22 are connected to the fuel sensor 20 and in turn are connected to an instrument panel 24 having a fuel flow indicator 26 and a fuel pressure indicator 28.

More particularly, the fuel supply source 12 is typically a refueling tank truck and the fuel receiving system 18 is typically the fuel storage tank housed within a vehicle for storage of fuel for powered movement of the vehicle. The fuel is typically liquid and is transferred from the fuel supply source 12 to the fuel receiving system 18 through the fuel pipeline or conduit 14. In the exemplary embodiment, and particularly for military aircraft, fuel level control valves 16 are interposed between the fuel line 14 and the fuel receiving system 18 so that when the storage tanks (not shown) of the fuel receiving system 18 are filled to capacity, the fuel level control valves will shut off further flow of fuel to the storage tanks. As discussed hereinbefore, if these level control valves 16 malfunction by not fully closing, the storage tanks will overflow causing the safety hazard of volatile fuel spilled onto the surrounding ground.

In order to prevent possible overflow of the fuel receiving system 18 it is desirable to predetermine that the fuel level control valves 16 are properly operable before fueling the system 18. In order to do this, in the exemplary embodiment, a test sample of fuel is provided from the fuel supply source 12 through the conduit 14 to the fuel receiving system 18. The rate of flow of a portion of fuel is sensed by fuel sensor 20 having a swing flapper which is pushed out of the fuel stream thereby uncovering a plurality of holes connected to a pair of sense lines 22. The sense lines 22 lead to the flow indicator 26 and pressure indicator 28 which can be located at a distant location for monitoring by fuel loading personnel. Sense lines 22 comprise hollow tubing for conducting a sample of the fuel test sample to the indicators 26, 28.

Indication of flow is provided by observation of rotation of a wheel 30 observable through a window 32. If there is excessive leakage in the fuel level control valve 16, the wheel will still rotate. However, with the wheel rotating during a leakage state, it is difficult for fueling personnel to determine whether or not the tank is full. Thus, further determination is supplied by a pressure indicator 28 which comprises a diaphragm having a barber pole connected to a rack and pinion for providing visual indication of over pressure.

If a fuel level control valve 16 is open, the wheel 30 will indicate fuel flow and the pressure indicator will indicate low pressure. If the fuel level control valve 16 is totally closed upon the fuel receiving system 18 having received the full refueling quantity, then the flow indicator 26 will indicate no fluid flow and the pressure indicator will indicate high pressure. It is in the failed condition where the fuel level control valve 16 is only partially closed wherein the flow indicator by itself would indicate fuel flow and would not convey sufficient information to operating personnel that the fuel level control valve 16 is not properly functioning in order to prevent fuel spillage.

The fuel pressure indicator 28 by itself would not convey sufficient information inasmuch as, depending upon the amount of leakage through the level control fuel valve, the pressure indicated by indicator 28 as vented through the vent 34 for fuel receiving system 18 would have a sufficiently low indication of pressure such that operating personnel would believe that the level of fuel in the fuel receiving system 18 has not reached shut-off level and the level control valve 16 did not close. If there is only a relatively small amount of leakage in valve 16, the pressure indicator 28 may indicate a sufficiently high pressure such that operating ground personnel would believe that the fuel flow has stopped when in reality it has not and would cause fuel spillage. Thus, the combination of a fuel flow indicator and a pressure indicator would indicate the conditions in the system necessary to properly determine the operative condition of control valve 16. Thus, in a state of partial opening of valve 16, the fuel flow indication is augmented by a simultaneous fuel pressure indication, it having been predetermined that, for the particular fuel system, readings of fuel flow and fuel pressure within predetermined limits indicate that the fuel limiting check valve 16 is properly functioning. For example, if valve 16 is sticking in an intermediate position and would not properly shut-off fuel to a full tank, then for a given test sample flow, the amount valve 16, which is normally closed, is open would be less than the amount of opening for a properly functioning valve. In such a case, the pressure measured by the pressure indicator 28 will be higher and outside of the predetermined limits for the given test sample flow for the particular system, and the improper functioning of the valve 16 can be determined prior to full delivery of the fuel.

To accomplish a determination of proper operation of valve 16, a sufficient amount of fluid is supplied through the system and operating personnel are provided with instructions such that visual indication of fuel flow and fuel pressure respectively by the flow indicator 26 and the fuel pressure indicator 28 simultaneously within respective predetermined limits indicates that the fuel level control valves 16 are not properly operating. The predetermined acceptable limits of the readings of the gages are tailored to the particular system and depends, for example, upon the type and flow characteristics of the fuel or fluid supplied, the type of check valve 16 used, the length and thickness of the delivery conduit 14, the venting of the fuel tank, and other pressure loss and flow restriction characteristics of the particular system. Accordingly, simultaneous gage indications outside of the predetermined limits will indicate that the valve 16 is properly operating and the refueling of the fuel receiving system 18 can commence safely.

It is within the contemplation of the present invention that the apparatus and method disclosed herein is applicable to fluids other than liquid fuel e.g. gaseous fuel. Additionally, the invention disclosed herein is symmetrical with respect to flow direction, i.e., it can be used in both the refueling and defueling direction, defueling being the removal of fuel from the fuel receiving system 18 and delivery of such removed fuel through the conduit 14 into the fuel supply source 12.

Thus, there is disclosed a apparatus and method thereof for determining the operable condition of fuel level control valves. A sensor is connected in a fuel line for delivery of fuel through the fuel line to a receiving system from a fuel supply source. At least one fuel level control valve is disposed in the fuel line between the sensor and the fuel receiving system. A plurality of sense lines is connected from the sensor to a flow indicator and a pressure indicator such that the simultaneous indication of the flow indicator and the pressure indicator within respective predetermined limits upon delivery of a test sample of fuel prior to actual delivery of the fuel through the fuel line indicates that the fuel level control valve is not properly operable.

While there has been illustrated and described what is at present considered to be a preferred embodiment of the present invention, it will be appreciated that numerous changes and modifications are likely to occur to those skilled in the art and it is intended that in the appended claims to cover all those changes and modifications which fall within the true spirit and scope of the present invention.

What is claimed as new and desired to be secured by Letters Patent is:

1. A method for determining the operable condition of a fluid level control valve of a fluid receiving system prior to delivery of the fluid through a conduit to a fluid receiving system from a fluid supply source comprising the steps of:
    delivering from the fluid supply source a test sample of fluid through the conduit, and
    simultaneously determining the flow of the test sample of fluid through the conduit and the pressure of the test sample of fluid in the conduit, the simultaneous indication of fluid flow and fluid pressure within respective predetermined limits determining that the fluid level control valve is not properly operable.

* * * * *